UNITED STATES PATENT OFFICE.

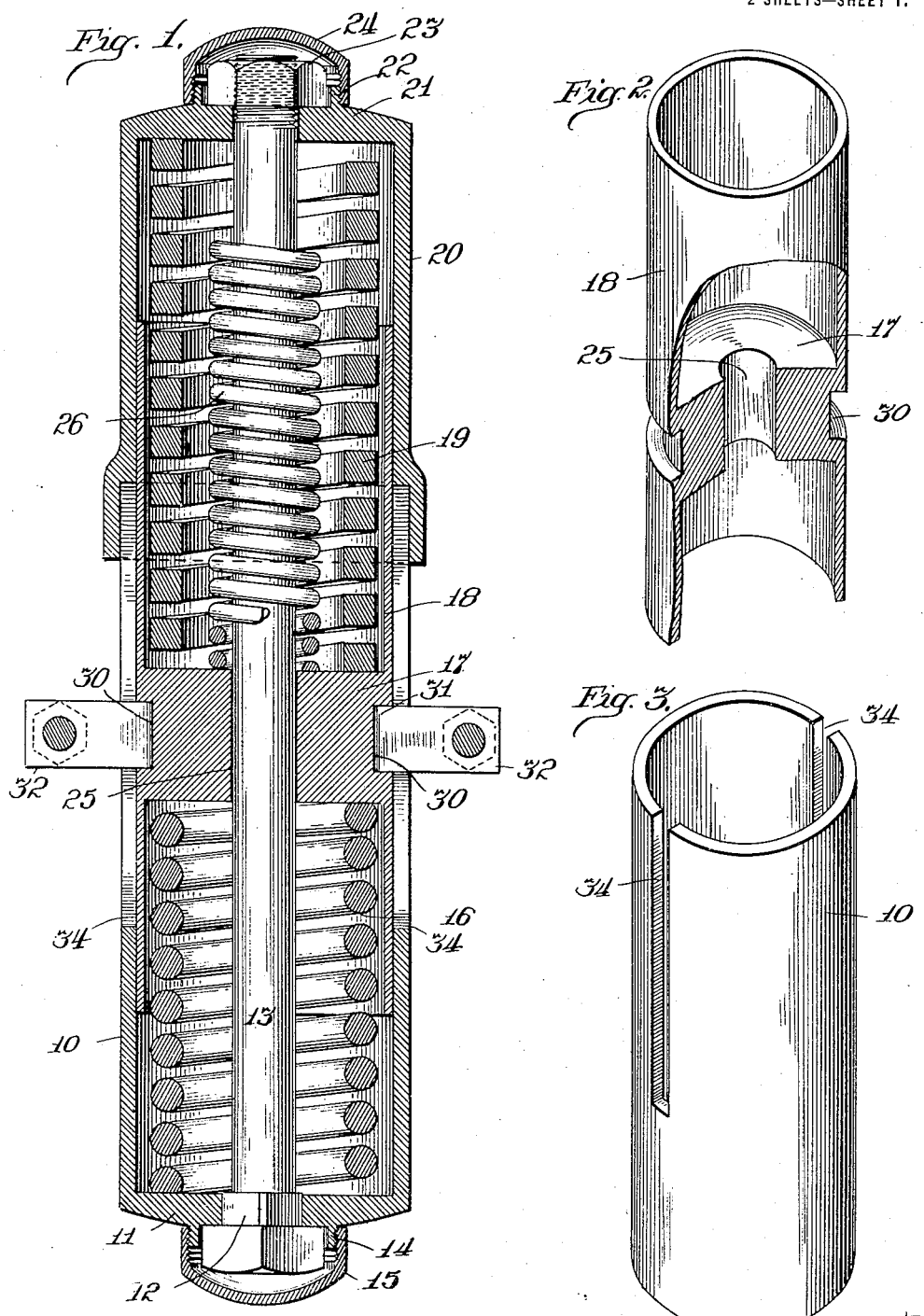

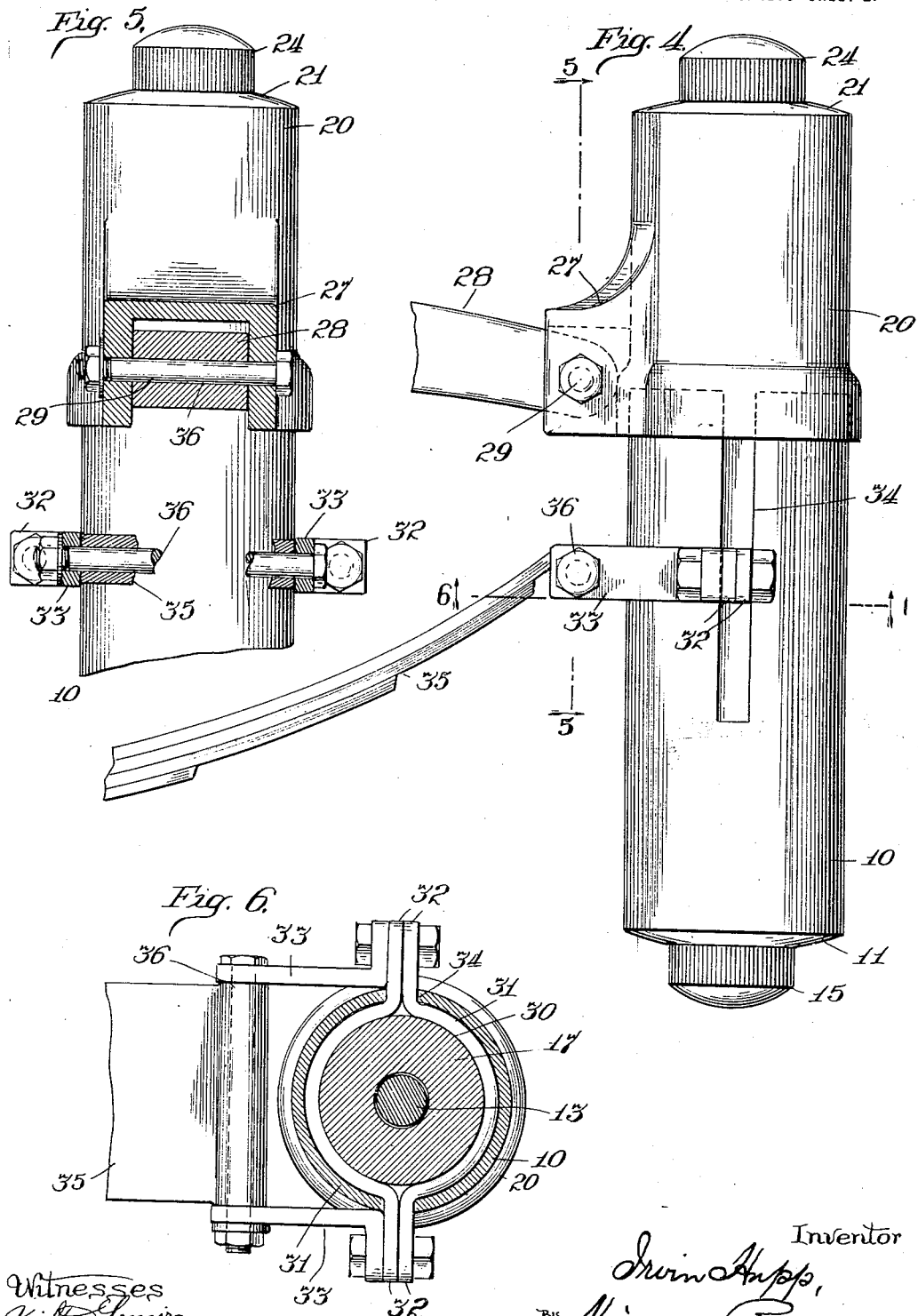

IRVIN HUPP, OF CHICAGO, ILLINOIS, ASSIGNOR TO HUPP, INCORPORATED, A CORPORATION OF ILLINOIS.

SHOCK-ABSORBING DEVICE.

1,316,483. Specification of Letters Patent. Patented Sept. 16, 1919.

Application filed November 22, 1917. Serial No. 203,445.

*To all whom it may concern:*

Be it known that I, IRVIN HUPP, a citizen of the United States, and a resident of Chicago, in the county of Cook and State of Illinois, have invented a certain new and useful Improvement in Shock-Absorbing Devices, of which the following is a description, reference being had to the accompanying drawings, which form a part of my specification.

My invention relates to a device more especially adapted for use on automobiles or other vehicles, and has for its object the provision of a construction which is adapted to "take up" or absorb the shocks encountered by the running gear and prevent the same being transmitted through the chassis or supporting connections to the body of the vehicle.

The invention also contemplates a construction adapted to "take up" any rebound that may be encountered in the return of the elements to normal position from any severe impacts or blows. The construction and its advantages will be more fully comprehended from the detailed description of the accompanying drawings, wherein:—

Figure 1 is a longitudinal sectional view of my improved device.

Fig. 2 is a detail perspective view, with portions broken away, of one of the members of the device.

Fig. 3 is a detail perspective view of one of the outer members.

Fig. 4 is a side elevation of my improved shock absorber shown secured to a portion of a vehicle frame or chassis and to one of the springs of the running gear.

Fig. 5 is a side view of the upper portion of the device as illustrated in Fig. 4, looking at the side to which the vehicle frame or chassis and the springs of the running gear are secured; a portion being shown in section.

Fig. 6 is a sectional view taken on the line 6, 6 of Fig. 4.

In the particular exemplification of the invention, it comprises an outer shell or member 10, preferably shown in the nature of a cylinder having a closed end or wall 11 at the bottom thereof, provided with an opening which, in the construction shown, is squared to receive the squared portion or shoulder 12 of a bolt or pin 13 which extends longitudinally through the device. The end wall 11 is provided with a boss 14 preferably counterbored to receive the head of the bolt or pin 13, as shown in Fig. 1; and the outer surface of the boss 14 is shown tapped or threaded to receive a cap 15 internally threaded to screw onto the boss 14.

Seated in the chamber of the member or cylinder 10 is a suitable coil spring 16, of proper length and strength, the upper end whereof bears against a diaphragm or transversely disposed portion 17 of an inner member or piston 18 which is shown in detail in Fig. 2. The member or piston 18, which conforms to the inner configuration of the outer members, is preferably shown cylindrical in order to have free movement in the cylinder or chamber of member 10. The diaphragm or transverse portion 17 is provided with the oppositely extending cylindrical walls, as shown in Fig. 2, adapted to be in sliding contact with the outer members; the lower wall of member 18 being intended to receive the upper end of spring 16, while the upper end or wall is intended to receive a coil spring 19, which bears on the diaphragm or transversely extending portion 17. The upper end of the shell or member 10 preferably extends into the lower flared or skirted portion of outer shell or member 20. The member 20, like member 10, is provided with a closed end wall 21, preferably shown provided with a boss 22, counterbored to receive a nut 23 which is screwed on the end of the pin or bolt 13; the outer face of the boss 22 being threaded like boss 14 to receive a cap 24 after the device has been properly assembled.

The bolt or pin 13, as shown in Fig. 1, extends entirely through the device and therefore through the springs; the diaphragm or transversely disposed portion 17 of plunger member 18 being provided with an opening 25 extending therethrough, see Figs. 1 and 2, for the passage of the bolt or pin 13 in order to permit free movement of plunger member 18 lengthwise of the bolt or pin.

The upper portion of the device, to-wit above the diaphragm of transversely disposed portion 17, is shown provided with an additional or auxiliary spring 26, preferably of less length than spring 19 so as not to come into play until spring 19 has been compressed to a predetermined extent; spring 19 being made of sufficient internal diameter to permit the insertion of spring 26. Spring 26 is preferably wound in the opposite direction from spring 19 in order that a seating of the coils of spring 26 between the coils of spring 19 will be impossible, which would interfere with the proper compression or action of the springs.

The outer member or upper shell 20 is provided with suitable lugs, or preferably arched lobe 27, adapted to receive the end of the vehicle-frame or chassis, as indicated at 28 in Fig. 4; the frame-portion 28 being pivotally secured by means of a suitable bolt or pin 29 adapted to pass through the lugs or lobe 27 and the frame of the chassis so as to permit oscillatory movement of the frame relative to the device about the bolt or pin 29.

The inner member or piston 18, at the point where it is provided with the diaphragm or transversely disposed portion 17, is preferably provided externally with a circumferential groove 30 adapted to receive the encircling strap 31. This strap 31 is preferably shown composed of two semicircular portions having the outwardly disposed lugs 32, to which are secured the angularly formed arms 33, 33. The arms 33 are intended to extend beyond the side wall or outer shell of the device, as shown in Figs. 4 and 6.

At diametrically opposite points, the outer shell or member 10 is provided with longitudinally disposed slots 34, 34 through which the lugs 32 of the encircling strap 31 extend, thus permitting free reciprocatory movement of the inner member or plunger 18 when shock-imparting blows or impulses are imparted to the device by means of the attaching members of the vehicle and its running gear.

The two outer members or shells 10 and 20, as illustrated in the drawings, have no movement relative to each other; the upper end of the lower member or shell 10 being fitted into the flared or skirted portion of upper member or shell 20, so as to take against the off-set portion or shoulder within the upper member or shell 20, thus providing a complete inclosure or housing to prevent ingress of any foreign matter which may affect the proper operation of the device. With the extended shell-formations of inner member 18 above and below the diaphragm or transversely disposed portion 17, it is apparent that these portions will be disposed across the slots 34, 34 and thus prevent the dust and dirt having too free access to the interior of the device.

Spring 16 having been placed in shell 10, piston 18 is then inserted by having lugs 32 extend through slots 34; springs 19 and 26 are then placed in the upper part of piston 18 and shell 20 placed thereover, after which the bolt or pin 13 is inserted through the device and nut 23 screwed into place. It is evident that the two outer members or shells 10 and 20 will be maintained in close relation with each other and therefore be compelled to move together should there be any movement of the vehicle-frame or chassis 28 relative to the running gear, so that members 10 and 20 will have similar movement relative to piston 18. The downward pressure of the vehicle frame or chassis, through bolt 29 to the outer members 10 and 20, will cause the two members 10 and 20 to move downwardly and therefore compress spring 19 located above the diaphragm or transversely disposed portion 17 of inner member or piston 18. Should the load placed on the vehicle be beyond a predetermined amount, to-wit beyond the initial compression of spring 19, it is evident that spring 19 will then be assisted in its cushioning effect by the auxiliary spring 26 adapted to help take up any load which may exceed the carrying capacity of spring 19, in which event the load is cushioned by both springs 19 and 26 and yieldingly transmitted through inner member 18, strap 31, arms 33 to the springs 35 of the running gear of the vehicle. The ends of the leaf-springs 35 are secured to the bolt or pin 36 which extends through both arms 33 and the encircling portion or clip of the spring so as to permit of oscillatory movement therebetween, see Figs. 5 and 6.

Should the running gear be subjected to sudden jars or impacts, it is apparent that these blows or impacts will be taken up by the spring 19, or both springs 19 and 26 if both springs have been compressed by the load in the vehicle, because they are disposed between the inner member 18 secured to the running gear and the outer member 20 secured to the vehicle frame or chassis.

The sudden return of the mechanism or device to its normal condition or the condition prior to the application of the blow or impact just referred to, due to the opposite movement of chassis and running gear, in other words the rebound, will be taken up by the spring 16 disposed beneath the diaphragm or transversely disposed portion 17 of inner member 18 and the closed end of lower outer member or shell 10.

As is clearly evident from the construction, the spring 19 may be made of strength sufficient to yieldingly take up the normal weight of the vehicle body or chassis and as the load on the vehicle is increased, this additional load, if it exceeds a predetermined amount may be taken up by both springs 19 and spring 26, so that all perpendicular shocks will be absorbed by the device.

I have described the specific embodiment disclosed in the drawings, but the invention may be expressed in somewhat different mechanical form without, however, departing from the spirit of the invention.

What I claim is:—

1. A shock absorbing device, comprising a pair of hollow members, one end of each member being closed while the other ends of said members have overlapping relation with each other, one of said members being adapted to be secured to the body of a vehicle while the other member is slotted lengthwise, means disposed longitudinally through said members whereby they are removably secured together, a plunger slidably mounted in said members and provided with lugs extending through the slotted sides of one of said first mentioned members, said lugs being adapted to be secured to the running gear of a vehicle, said plunger being formed with cylindrical flanges disposed in opposite directions and in sliding contact with the inner sides of the hollow members and of comparative length so as to cover said slots during the relative movements of said plunger and hollow members, and coiled springs arranged in the hollow members on opposite sides of said plunger and within the cylindrical flanges thereof, whereby cushioning relation between both ends of the plunger and the closed ends of said hollow member is provided.

2. A shock absorbing device, comprising a pair of cylindrical members, one end of each member being closed while the other ends of said members have abutting relation with each other, the one member being adapted to be secured to the body of a vehicle while the other member is provided with elongated slots in the sides thereof, a bolt disposed longitudinally through both members whereby the latter are removably held in abutting relation, a plunger slidably mounted in the member provided with the elongated slots and provided with lugs disposed through said slots and adapted to be secured to the running gear of a vehicle, said plunger being provided with cylindrical extensions disposed in opposite directions and in sliding contact with the inner sides of said cylindrical members and of comparative length so as to cover the slots in one of said members during the relative movements of said plunger and cylindrical members, a coil spring arranged on each side of said plunger and in abutting relation with the latter and with the closed end of the cylindrical member disposed on the same side of the plunger, said springs being located within the cylindrical extensions of the plunger, and an auxiliary spring disposed about the bolt and on one side of said plunger.

IRVIN HUPP.

Witnesses:
GEORGE HEIDMAN,
F. A. FLORELL.